United States Patent [19]

Tschirk

[11] Patent Number: 5,721,807
[45] Date of Patent: Feb. 24, 1998

[54] METHOD AND NEURAL NETWORK FOR SPEECH RECOGNITION USING A CORRELOGRAM AS INPUT

[75] Inventor: Wolfgang Tschirk, Vienna, Austria

[73] Assignee: Siemens Aktiengesellschaft Oesterreich, Vienna, Austria

[21] Appl. No.: 185,800

[22] PCT Filed: Jul. 21, 1992

[86] PCT No.: PCT/AT92/00100

§ 371 Date: Jan. 21, 1994

§ 102(e) Date: Jan. 21, 1994

[87] PCT Pub. No.: WO93/02448

PCT Pub. Date: Feb. 4, 1993

[30] Foreign Application Priority Data

Jul. 25, 1991 [AT] Austria .................. 1488/91

[51] Int. Cl.$^6$ ...................................... G10L 5/06
[52] U.S. Cl. ............................. 395/2.64; 395/2.68
[58] Field of Search ..................... 395/2.11, 2.41, 395/2.68, 2.64, 2.6–2.63, 2.75

[56] References Cited

U.S. PATENT DOCUMENTS

| | | |
|---|---|---|
| 4,715,065 | 12/1987 | Parker .................................... 381/46 |
| 4,975,961 | 12/1990 | Sakoe . |
| 5,040,215 | 8/1991 | Amano et al. . |
| 5,285,522 | 2/1994 | Mueller et al. ........................ 395/2.41 |
| 5,404,422 | 4/1995 | Sakamoto et al. .................... 395/2.41 |
| 5,426,745 | 6/1995 | Baji et al. ............................... 395/375 |
| 5,473,759 | 12/1995 | Slaney et al. ........................ 395/2.75 |

FOREIGN PATENT DOCUMENTS

| | | |
|---|---|---|
| 0 435 282 A | 3/1991 | European Pat. Off. .......... G10L 7/08 |
| 0435282 | 7/1991 | European Pat. Off. . |
| 3837385 | 5/1989 | Germany . |

OTHER PUBLICATIONS

Patent Abstracts of Japan, vol. 10, No. 340, Nov. 18, 1986, JP 61–144157, Jul. 1, 1986.
Rumelhart et al., "Parrallel Distributed Processing", p. 328, 1986 Massachusetts Institute of Technology.
Behme, "A Neural Net for Recognition and Storing of Spoken Words", Parrallel Processing in Neural Systems and Computers, Elsevier Sci. Pub. 1990.
Kowalewski et al., "Word Recognition with a Recurrent Neural Network", Parrallel Processing in Neural Systems and Computers, Elsevier Sci. Pub. 1990.
Komori et al., "Combining Phoneme Identification Neural Networks into an Expert System Using Spectrogram Reading Knowledge", ICCASSP '90, IEEE Acoustics, Speech and Signal Processing Conference, 1989.
Hatazaki et al., "Phoneme Segmentation Using Spectrogram Reading Knowlege", ICCASSP '89, IEEE Acoustics, Speech and Signal Processing Conference, 1989.
Komori et al., "Robustness of a Feature Based Phoneme Segmentation System to Speaker Independent and Countinuous Speech", ICCASSP '91, IEEE Acoustics, Speech and Signal Processing Conference, 1991.
Palakal et al., "Feature Extraction from Speech Spectrograms Using Multi–Layered Network Models", Tools for Artificial Intelligence, 1989 Int'l Workshop.
Patent Abstracts of Japan, vol.10, No.340, Nov. 18, 1986 JP 61–144157 –JP 61–144159, Jul. 1, 1986.
Patent Abstracts of Japan, vol.14, No.264, Jun. 7, 1990 JP 2–72396 –JP 2–72398, Mar. 12, 1990.
Muthusamy et al, "Speaker–Independent Vowel Recognition: Spectrograms Versus Cochleagrams", ICASSP '90: Acoustics, Speech and Signal Processing Congerence 1990.

*Primary Examiner*—Allen R. MacDonald
*Assistant Examiner*—Robert C. Mattson
*Attorney, Agent, or Firm*—Herbert L. Lerner; Laurence A. Greenberg; Werner H. Stemer

[57] ABSTRACT

A method and device for recognizing individual words of spoken speech can be used to control technical processes. The method proposed by the invention is based on feature extraction which is particularly efficient in terms of computing capacity and recognition rate, plus subsequent classification of the individual words using a neural network.

9 Claims, 3 Drawing Sheets

1

METHOD AND NEURAL NETWORK FOR SPEECH RECOGNITION USING A CORRELOGRAM AS INPUT

BACKGROUND OF THE INVENTION

Field of the Invention

The invention relates to a method for recognizing individual words of spoken language, and an apparatus for performing the method.

The recognition of spoken speech is among the most important fields in communications technology for the future, yet at the same time is among the most difficult. A great number of applications for speech recognition exist, such as spoken input rather than keyboard input in text processing systems (phonetic typewriters), information retrieval or ordering over the telephone, and speech control of machine systems. Thus far, however, the widespread introduction of speech recognition systems has failed because of a number of unsolved problems that are both technical and psychological in nature.

Speech recognition is a task of pattern recognition. The speech signal of the spoken expression (sound-word-sentence, etc.) forms the input pattern, whose significance must be recognized or understood.

The recognition process can be broken down into two stages: feature extraction and classification. Feature extraction serves to extract the characteristics that are relevant to recognition from the speech signal and to eliminate portions that are not relevant. In the second step classification conclusions—as to the significance of the present speech sample are drawn from the present extracted characteristics.

The object of the invention is to disclose a method with which a limited number of individual words of spoken speech can be recognized.

SUMMARY OF THE INVENTION

This is done in accordance with the invention by a method defined by claim 1.

The method of the invention is distinguished by especially high recognition rates. Moreover, it is relatively insensitive to background noise. A further advantage of the method is that the correlogram K on which the classification of the individual words is based can be defined simply. This simple calculatability is a prerequisite for achieving a speech recognition system at little expense for hardware. Another advantage of the method is that the number of recognizable individual words is not fundamentally limited. The method of the invention is therefore especially advantageous in applications involving a very large vocabulary.

A favorable compromise between the amount of data to be processed—the expenditure for calculation—and a high recognition rate is achieved by embodying the method as defined by the body of claim 2.

Especially high recognition rates are achieved if the conditions as defined by the body of claim 3 are chosen for the indices j, h, k of the correlogram K.

The use of a neural network for classifying the spoken individual word has further advantages. Neural networks are a rough simulation of the human brain structure, with its associative mode of functioning. In problems of pattern recognition, of the kind that also exist in speech recognition, they are superior to conventional computer structures.

The neural network as defined by the body of claim 5 is distinguished by its especially good "learnability"; that is, the "training phases" for the words to be recognized are reduced to a minimum.

A feature of the method as defined by claim 6 brings about simple attainability of the neural network and a further reduction in the expenditure for calculation.

With the apparatus of claim 7, the method according to the invention can be attained especially favorably.

For use in higher-order systems, it is favorable if the entire apparatus defined by claim 8 is embodied as an integrated component.

The use of a speech recognition method in a telephone set in accordance with claim 9 not only brings about great convenience in use but also, when used in a car phone, an increase in traffic safety, since the driver and telephone user is not diverted by the dialing process.

The invention will be described in further detail in conjunction with four figures.

DESCRIPTION OF THE PREFERRED EMBODIMENTS

Figure 1:
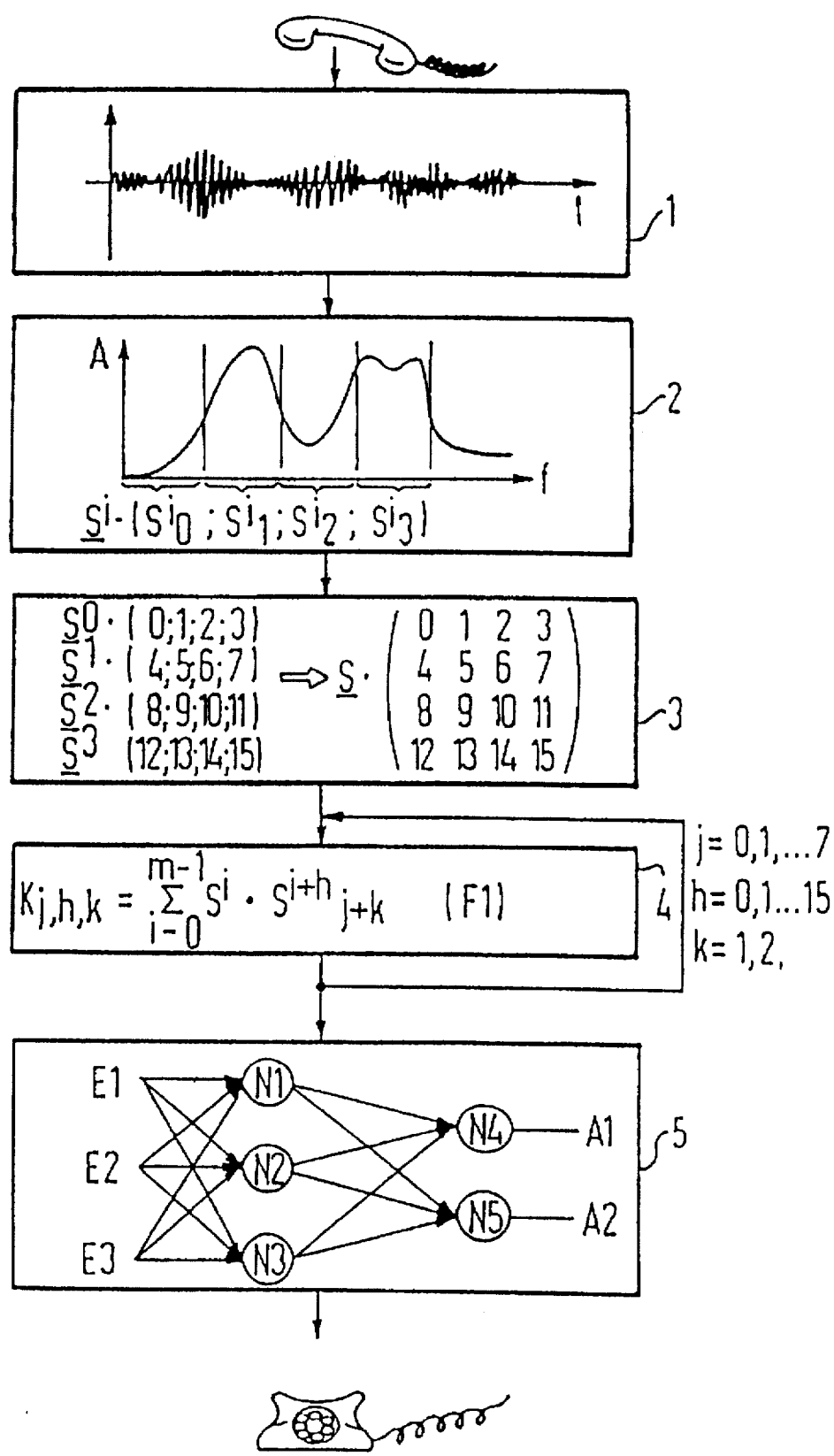
FIG. 1, a course of the method of the invention.

The method shown in FIG. 1 is employed in a telephone set to trip the dialing process. With the method, ten different individual words can be recognized. Associated with each individual word is one specific telephone number, which once the word is recognized is formed automatically.

To that end, after the receiver has been lifted, the individual word, for example the name of the subscriber desired, is spoken into the receiver, and the set then forms the associated number automatically. This is especially advantageous in car phones, in which a conventional dialing process can impair the traffic safety of the person doing the dialing.

The method of the invention proceeds as follows: in a first method step 1, the word spoken in an expectation time period through a microphone of the telephone set is converted into an electrical signal. This signal is amplified, sampled and digitized, in other words converted into a succession of sampled values. The sampling rate is typically 8 kHz.

For the sampling to detect all the essential signal properties, the sampling theorem must be fulfilled. This states that the highest frequency occurring in the signal must be less than half this sampling frequency, because otherwise, by what is known as the aliasing effect, falsification of the signal information will occur. In the present case, this means that the speech signal is allowed to have only frequency components below 4 kHz. This is the case in a telephone signal having a frequency range of 150 Hz to 3400 Hz.

From 256 sampling values at a time, in a second method step 2, the mean spectral amplitude distribution of the speech signal in the time period of 32 ms, determined by the number of sampling values, is calculated by means of a Fourier transform, and is displayed as a spectral vector $S^i$. Each spectral vector $S^i$ includes eight elements $(S_0^i, S_1^i, \ldots, S_7^i)$, of which each represents the amplitude of a frequency band having the bandwidth $b_c$=406.25 Hz. The entire frequency band detected thus encompasses 406.25 Hz×8= 3250 Hz and is within the frequency range of the telephone system.

Half the frequency of the spectral vectors $S^i$, which is $0.5 \times 1/32 = ms = 15.625$ Hz, in accordance with the sampling theorem, forms a limit for the information transfer. Here the limit pertains to the frequency respectively the duration of the individual phonemes.

Figure 2:
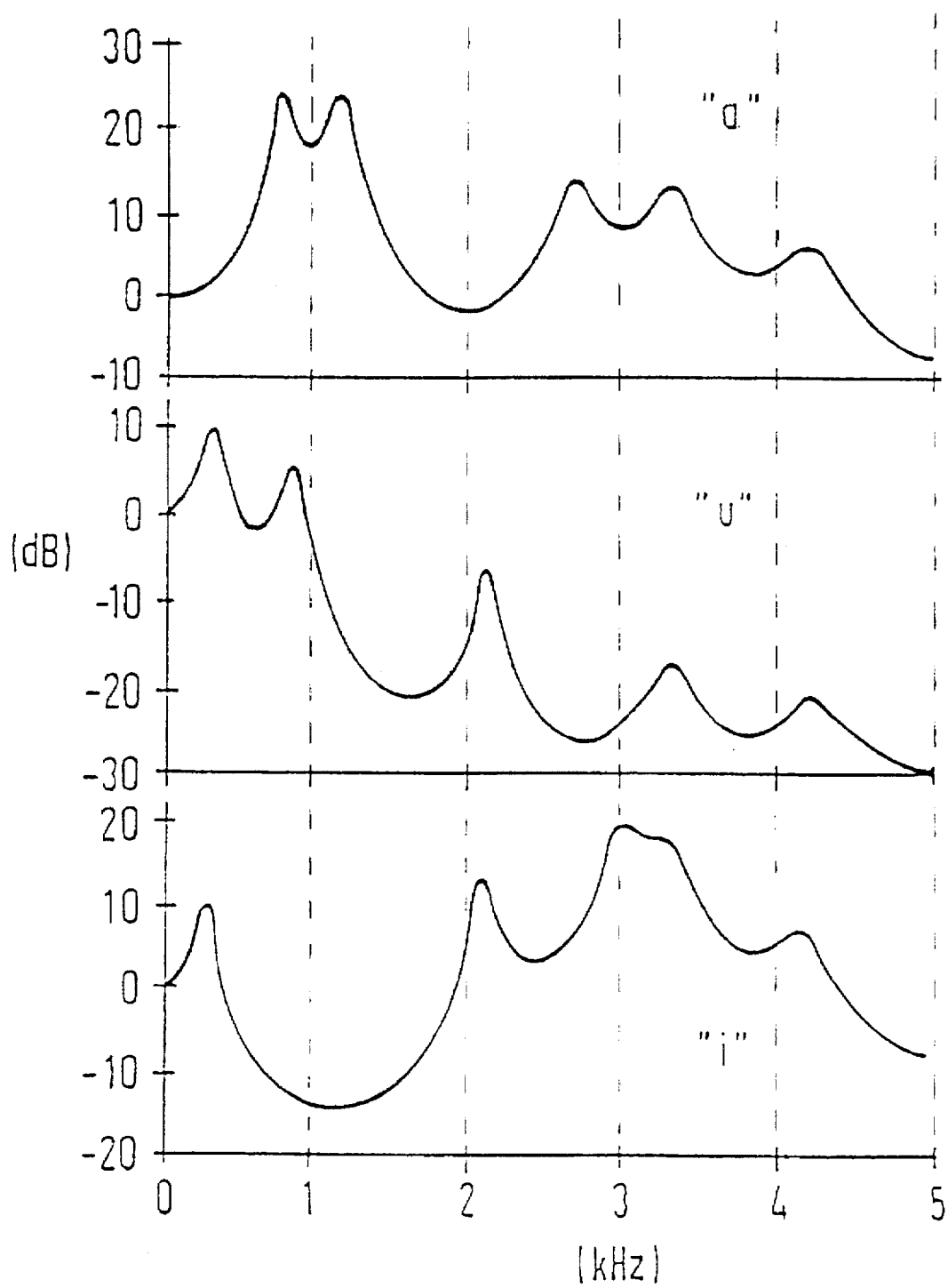
FIG. 2, the spectral amplitude distribution of three different phonemes.

Phonemes are the smallest word elements with which information that imparts meaning can be associated. Each phoneme, of which the German language, for instance, has approximately 40, is determined by a characteristic spectral amplitude distribution. To that end, FIG. 2 in a diagram shows the spectral amplitude distribution for the phonemes that correspond to the vowels "a", "u" and "i".

Experiments have shown that approximately 95% of the phonemes are longer than 62 ms, or in other words have a frequency that is less than 16 Hz. These phonemes are therefore correctly reproduced by the spectral vectors $S^i$. The remaining 5% of speech components, such as explosive sounds (p, t, etc.) play only a small role for intelligibility. Hence it is of no practical significance that they are not detected exactly with the present method.

From the spectral vectors $S^i$, ascertained in the expectation time period, that in accordance with the above discussion contain the essential characteristics of the spoken individual word, a spectrogram S is formed, in a third method step 3. This is done by arranging the spectral vectors in a two-dimensional matrix, where each spectral vector forms one line of this matrix. In a fourth method step 4, the individual elements $K_{j,h,k}$ of a correlogram K is formed, in accordance with the following equation:

$$K_{j,h,k} = \sum_{i=0}^{m-1} s_i^j * f_{i+k}^{j+h}$$

The size of this correlogram is determined by the range of values of the coordinates. The range in this example is as follows:

$$j=0, 1, \ldots, 7; h=0, 1, \ldots, 15; k=1, 2;$$

The configuration of the correlogram K is such that each of the indices defines one physical parameter of the speech signal. Index j designates the frequency band, that is, if j=3, for instance, the range from 1368.75 Hz to 1775 Hz; index h defines the time displacement between the signal components to be correlated, where if h=15, for instance, the maximum displacement is 15×32 ms=480 ms. Index k defines a frequency displacement $\Delta f$ between the signal components to be correlated, where if k=2, then $\Delta f=812.5$ Hz.

One result among others of handling the speech signal in accordance with the invention is that the elements of the correlogram K are essentially independent of time. The beginning and end of the spoken individual word and its duration accordingly become less significant.

This time independence is an essential prerequisite for successful speech recognition. In conventional methods, it is achieved by such complicated methods as "Dynamische Zeitnormierung" [Dynamic Time Warping] (see M. Sakoe and S. Chiba, Dynamic programming algorithms optimization for spoken word recognition; IEEE Trans. on ASSP, ASSP-26). In the method of the invention, this calculation expenditure, and the errors that occur in this method, are avoided.

With the values given for the indices j, n, k and the condition $j+k \leq j_{max}$, the correlogram K contains 208 elements, which in a further method step are employed for classification of the spoken individual word. To that end, each element is applied to one input of a neural network.

This network thus contains 208 inputs, and one output for each word to be recognized, or in other words ten outputs.

Figure 3:
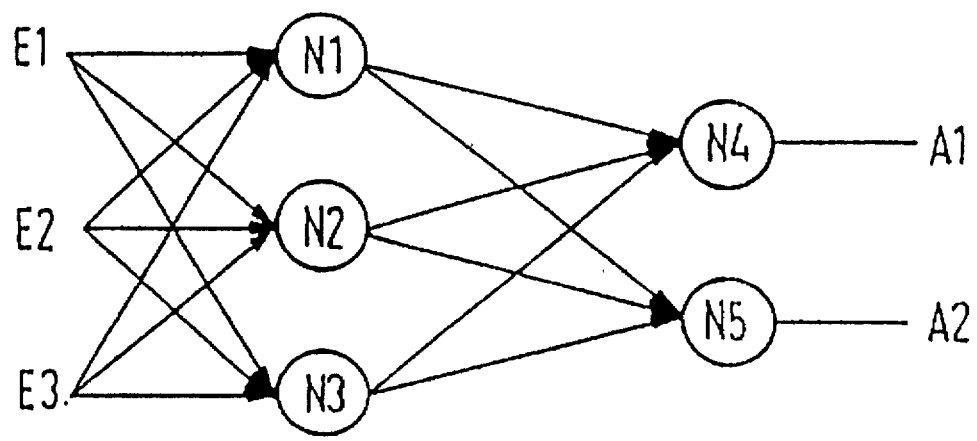
FIG. 3, the structure of a neural network.

The structure of the neural network will be described in detail in conjunction with FIG. 3. The drawing shows a so-called "feedforward neural network". This network includes an input layer, comprising input neurons N1, N2, N3, and an output layer with output neurons N4, N5. The network has three inputs E1, E2 and E3 and two outputs A1, A2. Each input E1, E2, E3 is connected to each input neuron N1, N2, N3. The sole output of each input neuron is connected to each output neuron N4, N5, each of whose outputs A1, A2 display a recognized pattern.

The requisite size of a neural network is determined by the complexity of the task to be done. As already noted, the number of input elements (the dimension of an input characteristic vector) determines the number of network inputs E1, E2, E3. The number of network outputs A1, A2 is defined by the number of patterns to be recognized. Since each neuron has only a single output, then once the number of network outputs is defined, the number of output neurons N4, N5 is fixed as well. In the present example it amounts to ten, in accordance with the number of individual words to be recognized.

The requisite number of input neurons N1, N2, N3 is dependent on the number of patterns (individual words) to be recognized, on the dimension of the input characteristic vector (that is, the number of elements in the correlogram K), but also on the differences among the patterns (individual words) to be recognized. To distinguish words that sound similar, a more comprehensive neural network is therefore needed than for words that can be clearly distinguished.

The number of input neurons N1, N2, N3 is therefore defined by means of an iterative configuration process, comprising a plurality of so-called training phases of the neural network. The patterns (individual values) to be recognized are applied to the inputs of the neural network and compared with the desired output result.

From the comparison, statements as to the "tuning" of the various neurons N1, N2, N3, N4, N5 are obtained by the so-called "backpropagation" algorithm (P. Werbos, Beyond Regression: New Tools for Prediction and Analysis in the Behavioral Sciences; Ph.D. thesis, Harvard University, Cambridge, Mass., August 1974).

Essentially, each neuron comprises one summation element, to which the values applied to the inputs of the neuron are supplied in weighted form, and one nonlinear amplifier element between the summation element and the output of the neuron. A more-detailed description of the structure of a neuron may be found for instance in "Layered Neural Nets for Pattern Recognition", by B. Widrow, R. D. Winter, and R. A. Baxter; IEEE Transactions on Acoustics, Speech and Signal Processing, Vol. 36, No. 7, July 1988.

The "tuning" of the neuron is done via the definition of the weights with which the input values are amplified. The goal of the learning and training phase of the neural network is accordingly the definition of all the weights of a network such that the desired recognition process takes place accordingly. The weights are therefore the carriers of the information of a neural network.

If the goal of the correct recognition process during a learning and training phase is not attained, then this generally means that the number of neurons in the network is too low for the particular problem and must therefore be increased. After that, the learning and training phase is repeated with the enlarged neural network.

In the present exemplary embodiment, 20 input neurons are adequate in the predominate number of cases. Accordingly, this number is also assumed for the first training phase. Within a first segment of the training phase, which comprises a maximum of ten repeats of the set-point/actual outcome comparison and the associated "tuning" of the network, the network must achieve the capability to recognize ten different individual words, with each individual word being present in up to 20 different samples, which may have been provided by different persons. If it fails to achieve this, then the number of input neurons is increased (to 21), and the training phase is repeated. If the number of input neurons suffices and the recognition process can be carried out in principle for a neural network, then it is correctly carried out after from 5 to 6 repeats. After that, in a second segment of the training phase, which comprises eight repeats, the training effect is intensified. After the conclusion of this second segment, the neural network is ready for use.

Figure 4:
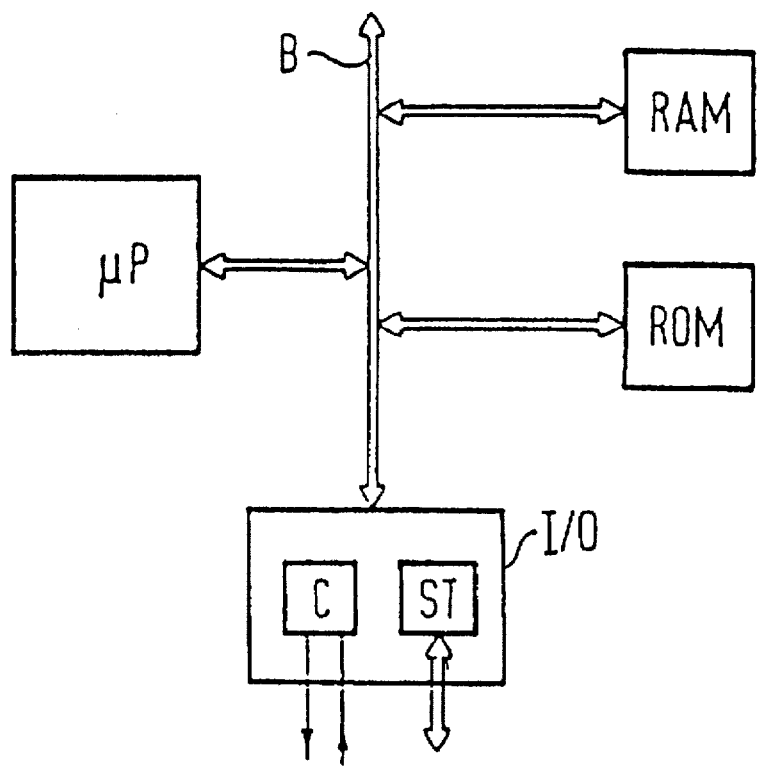
FIG. 4, an apparatus for performing the method.

FIG. 4 shows an example of an apparatus for carrying out the method of the invention. It includes a digital signal processor block µP, a bus system B, a program memory ROM, a working memory RAM, and an input/output unit I/O.

The apparatus is made up in a manner known per se of components available on the market. The nucleus of the digital signal processor block µP is a signal processor of the ASDP 2111 type made by the company Analog Devices. The layout of the apparatus can be found in more detail in a user's manual for this signal processor. The input/output unit includes a signal portion C, which is made up of a commercially available PCM-Codec, and a control portion ST for connection with a controlling unit, such as a personal computer.

Via the signal portion C of the input/output unit, the input of the speech signal and a possible acoustic speech output, such as instructions for operation, are done.

I claim:

1. A method for recognizing individual words of speech, which comprises:

converting speech during an expectation time period into an electrical speech signal;

ascertaining an instantaneous spectral amplitude distribution of the speech signal during time intervals defined by a duration of a phoneme and representing the instantaneous spectral amplitude distribution as a spectral vector $S^i$ ($i=0, 1, \ldots, m-1$), wherein each element ($S^i_0, S^i_1, \ldots, S^i_{n-1}$) of the spectral vector $S^i$ represents an amplitude of a frequency band having a predetermined bandwidth, and n is an integer representing a number of divisions of a total detected frequency band into the frequency bands having the predetermined bandwidth;

forming a spectogram S from the spectral vectors $S^i$ in accordance with $$S = \begin{bmatrix} S^0{}_0, S^0{}_1 \ldots S^0{}_{n-1} \\ S_0{}^1, \\ \cdot \\ \cdot \\ \cdot \\ S_0^{m-1} \end{bmatrix} = \begin{bmatrix} S^0 \\ S^1 \\ \cdot \\ \cdot \\ \cdot \\ S^{m-1} \end{bmatrix}$$

deriving a correlogram K from the spectrogram S, wherein the correlogram K has coordinates j, h, k and each element $K_{j,h,k}$ of the correlogram K is formed in accordance with $$K_{j,h,k} = \sum_{i=0}^{m-1} S_j^i * S_{j,k}^{i+h}$$

and classifying an individual spoken word with a word-typical characteristic pattern with the correlogram K.

2. The method according to claim 1, which comprises defining the time interval $t_s$ between two successive spectral vectors $S^i$ and $S^{i+1}$ equal to 32 ms.

3. The method according to claim 1, which comprises selecting each of the indices j, h, k of the correlogram K according to $$k>0; \; k * b_c < 1 \text{ kHz}$$

$$j+k \leq n-1$$

$$j \geq 0; \; h \geq 0; \text{ and}$$

$$h * t_s < 500 \text{ ms};$$

wherein $b_c$ is the predetermined bandwidth of a frequency band and $t_s$ is a time interval defined by the duration of the phonemes.

4. The method according to claim 1, which comprises classifying the spoken individual word with a neural network.

5. The method according to claim 4, which comprises assigning each element of the correlogram K to each of a first number of neurons in an input plane of the neural network;

assigning each of the neurons of the input plane to each of a second number of neurons in an output plane of the neural network; and indicating a defined recognized individual word with an output of a respective one of the neurons of the output plane.

6. The method according to claim 4, which comprises calculating in each of the neurons with a nonlinear transfer function $$f(x) = \frac{x}{|x|+1}$$

7. The method according to claim 1, which further comprises initiating a dialing process in a telephone set as a function of the recognized individual word of a telephone number associated with the individual word.

8. An apparatus for recognizing spoken words, comprising:

a digital signal processor connected to a bus system, said bus system including data, address and control lines, and a program memory, a working memory, and an input/output unit each connected to said digital signal processor via said bus system;

said digital signal processor including means for converting speech spoken during an expectation time period into an electrical speech signal; means for ascertaining an instantaneous spectral amplitude distribution of the speech signal during a time interval defined by a duration of a phoneme; means for representing the instantaneous spectral amplitude distribution as a spectral vector, each element of the spectral vector representing an amplitude of a frequency band having a predetermined bandwidth; and means for classifying an individual spoken word with a word-typical characteristic pattern derived from the spectral vector representing the instantaneous spectral amplitude distribution of the individual spoken word.

9. The apparatus according to claim 8, wherein said digital signal processor, said bus system, said program memory, said working memory, and said input/output unit are formed as an integrated circuit.

* * * * *